(12) United States Patent
Baita et al.

(10) Patent No.: US 8,431,658 B2
(45) Date of Patent: Apr. 30, 2013

(54) PROCESS FOR FEEDING A CATALYST IN A POLYMERIZATION REACTOR

(75) Inventors: Pietro Baita, S. Maria Maddalena (IT); Rainer Karer, Kaiserslautern (DE); Gerhardus Meier, Frankfurt (DE); Guido Funk, Worms (DE); Gabriele Mei, Ferrara (IT)

(73) Assignee: Basell Poliolefine Italia S.r.l., Milan (IT)

( * ) Notice: Subject to any disclaimer, the term of this patent is extended or adjusted under 35 U.S.C. 154(b) by 0 days.

(21) Appl. No.: 13/142,444

(22) PCT Filed: Dec. 23, 2009

(86) PCT No.: PCT/EP2009/067906
§ 371 (c)(1),
(2), (4) Date: Aug. 3, 2011

(87) PCT Pub. No.: WO2010/076289
PCT Pub. Date: Jul. 8, 2010

(65) Prior Publication Data
US 2011/0282013 A1    Nov. 17, 2011

Related U.S. Application Data

(60) Provisional application No. 61/204,702, filed on Jan. 9, 2009.

(30) Foreign Application Priority Data

Dec. 29, 2008  (EP) ..................... 08173033

(51) Int. Cl.
*C08F 4/44*    (2006.01)
*B01J 31/02*    (2006.01)

(52) U.S. Cl.
USPC .......... 526/66; 526/123.1; 526/901; 526/348; 526/154; 526/902

(58) Field of Classification Search .................... 546/90; 526/66, 123.1, 348, 154, 902
See application file for complete search history.

(56) References Cited

U.S. PATENT DOCUMENTS

| | | | |
|---|---|---|---|
| 3,779,712 A | 12/1973 | Calvert | |
| 4,399,054 A | 8/1983 | Ferraris | |
| 4,687,381 A | 8/1987 | Dumain et al. | |
| 5,310,833 A | 5/1994 | Kubo et al. | |
| 6,114,276 A * | 9/2000 | Kong et al. | 502/226 |
| 2009/0143546 A1* | 6/2009 | Fouarge et al. | 526/64 |

FOREIGN PATENT DOCUMENTS

| | | |
|---|---|---|
| EP | 0776691 | 6/1997 |
| GB | 1333738 | 10/1973 |
| LU | 79915 | 7/1978 |
| WO | WO-2004106388 | 12/2004 |
| WO | WO-2007071527 | 6/2007 |
| WO | WO-2008056339 | 5/2008 |
| WO | WO 2008/145601 | * 12/2008 |
| WO | WO-2008145601 | 12/2008 |

* cited by examiner

Primary Examiner — Robert D. Harlan

(57) ABSTRACT

A process for introducing a catalyst powder based on a titanium compound supported on magnesium halide into a gas-phase olefin polymerization reactor, characterized in that it comprises:
(a) storing the catalyst powder under an atmosphere of a liquid $C_3$-$C_{12}$ alkane;
(b) withdrawing from step (a) a measured amount of said catalyst powder by means of a rotary valve;
(c) transferring said metered amount of catalyst powder to a catalyst activation section by a continuous pick-up flow of a liquid $C_3$-$C_{12}$ alkane;
(d) contacting the catalyst powder with a liquid phase comprising an organo-aluminum compound and optionally an external donor compound, at a temperature ranging from −20° C. to 60° C.;
(e) introducing the activated catalyst powder in one or more gas-phase olefin polymerization reactors, where a gaseous mixture comprising at least one alpha-olefin is subjected to polymerization.

10 Claims, 1 Drawing Sheet

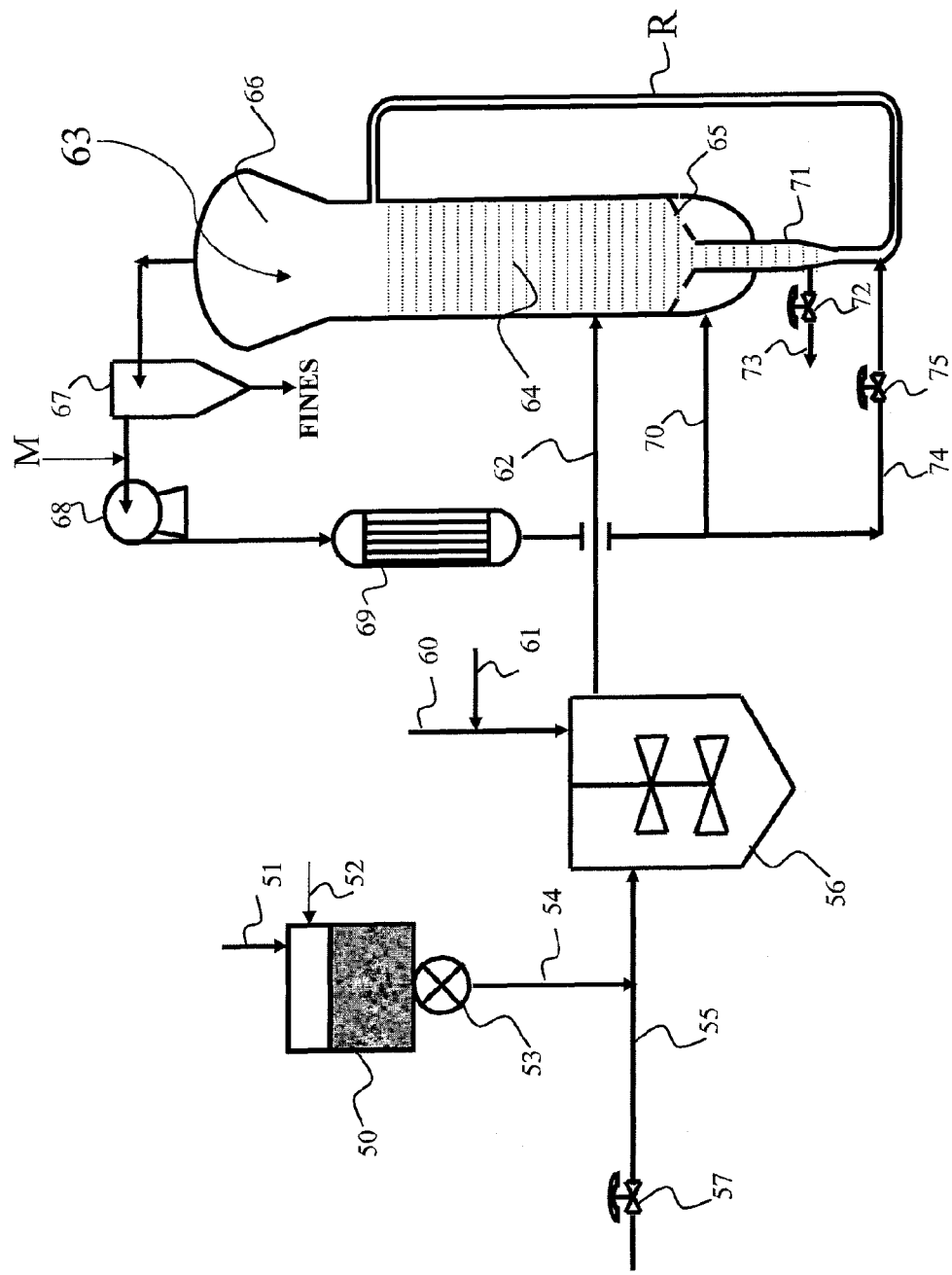

PROCESS FOR FEEDING A CATALYST IN A POLYMERIZATION REACTOR

This application is the U.S. national phase of International Application PCT/EP2009/067906, filed Dec. 23, 2009, claiming priority to European Patent Application 08173033.5 filed Dec. 29, 2008, and the benefit under 35 U.S.C. 119(e) of U.S. Provisional Application No. 61/204,702, filed Jan. 9, 2009; the disclosures of International Application PCT/EP2009/067906, European Patent Application 08173033.5 and U.S. Provisional Application No. 61/204,702, each as filed, are incorporated herein by reference.

The present invention relates to a process for introducing a catalyst powder into a gas-phase reactor for the olefin polymerization. In particular, the invention relates to a process for the storage of a catalyst powder and the consequent catalyst feed to a gas-phase polymerization reactor.

It is known that in a process for the olefins polymerization a challenging problem is given by the optimization of catalyst storage, catalyst dosage and the successive introduction of the metered catalyst powder into the polymerization reactor. These catalyst feeding steps should be performed while minimizing any undesired consequence on the desired catalytic effect. Undesired drawbacks may arise from catalyst degradation, plugging of feed lines, poor mixing of the catalyst with other components, such as catalyst activators, donors, and feed of undesired quantities of a carrier material to the polymerization reactor.

Gas-phase polymerization reactors often employ dry catalyst delivery systems, wherein a compressed inert gas is used to deliver the solid catalyst particles to the polymerization reactor. The term "dry catalyst" means that the catalyst, at the time when it is stored and transferred to the reactor, is not suspended in a liquid and is not in a slurry form.

Dry catalyst delivery systems transfer a dry catalyst from a storage vessel to a gas-phase reactor which is operated under pressure. The storage vessel containing the dry catalyst is kept at a pressure which is higher than the gas-phase reactor pressure, generally using an inert gas under pressure. Said inert gas is generally nitrogen, or any other gas which does not react with the catalyst particles. The storage vessel has an entry orifice through which the particles are introduced and an exit orifice which communicates with a metering device, such as a rotary valve, the function of which is to deliver steadily a determined quantity of said catalyst particles to the downstream equipment.

In order to deliver metered quantities of the solid particles into the gas phase reactor, means are arranged for conveying the said metered quantity from the exit of the said metering device to the reactor. These means chiefly comprise a pipe preferably equipped with safety, isolation and required control valves, in which preferably is passed a fluid, generally gaseous, e.g. a carrier gas which serves to convey the solid particles up to the gas-phase polymerization reactor.

Known systems for introducing catalytically active solid particles into a gas phase reactor differ in the nature of the carrier gas, which may be an inert gas such as those mentioned above or a gas which reacts with said particles. In the latter case, for the sake of simplicity, a fluid is chosen whose presence is necessary in the reactor, in most cases a gaseous monomer or a gaseous mixture containing one or more monomers. Many documents describe devices and processes for introducing solid particles into a gas phase reactor.

British Patent No. 1,333,738 describes a process and a device for injecting catalyst into a fluidized bed reactor. This patent describes a process which consists in delivering a metered quantity of catalyst from a storage vessel into a chamber which is brought alternately into communication with the said storage vessel and with the reaction zone of the fluidized bed. The device comprises a catalyst storage vessel communicating with a metering valve comprising a chamber, and means for supplying a carrier gas capable of passing through the said chamber and moving the metered quantity of catalyst into the reactor, when the chamber of the said metering valve is brought into communication with the reactor.

French Patent No. 2,183,298 relates to a process and a device for introducing a solid catalyst into a fluidized bed polymerization reactor by means of a capillary tube whose internal diameter is between 0.76 and 3.2 mm.

French Patent No. 2,562,077 also relates to a process and a device for feeding a fluidized bed reactor with a catalyst powder. The device comprises a catalyst storage container connected to a metering device communicating with an intermediate chamber intended to reduce the packing of the powder. An inert carrier gas line opens into the upper part of the intermediate chamber and from the bottom part of the said chamber leaves a pipe for conveying powder as far as the reactor. Said pipe comprises a vertical part immediately followed by a substantially horizontal part, the two parts being connected by an elbow which results in accumulation of powder which is thus transported to the reactor in a pneumatic plug flow.

The main problem with the above processes is that the solid particles tend to be delivered to the reactor in a concentrated mass, which is often compacted and difficult to disperse immediately and homogeneously in the reactor, thereby encouraging local hot spots and production of agglomerates and other non uniform products.

EP-B-776691 tries to solve the above mentioned drawbacks of poor homogeneity in the catalyst delivery disclosing a process which comprises the storage of the catalyst as a dry powder under an inert atmosphere, the withdrawal of a measured amount of dry powder from the storage tank and then the formation of a catalyst suspension by feeding the dry powder and a liquid hydrocarbon into a mixing chamber. The obtained suspension of catalyst in the liquid hydrocarbon is therefore transferred from the mixing chamber to the gas-phase olefin polymerization reactor. In the example given in EP-B-776691 the polymerization catalyst is stored as a dry powder in a hopper kept under a nitrogen atmosphere under a pressure of 2.7 MPa. A suitable amount of said dry catalyst is metered by means of a rotary valve and is introduced into a mixing chamber where it is suspended in a liquid mixture of n-pentane and isopentane. This catalyst suspension is then introduced into the gas-phase polymerization reactor.

Some drawbacks may be associated with the catalyst delivery process described in EP-B-776691. For instance, little amounts of the liquid hydrocarbon used to form the catalyst suspension may flow upwards through the metering valve and may enter the bottom of the catalyst hopper. Furthermore, little amounts of nitrogen coming from the catalyst storage tank can pass through the dosing valve together with the catalyst powder, so that nitrogen can reach the downstream equipment, such as a catalyst activation vessel, if present. It is known to those skilled in the art that a Ziegler-Natta catalyst is activated in a liquid phase by contacting the solid catalyst particles with a liquid organo-aluminum compound (catalyst activator). As a consequence, the eventual presence of nitrogen inside the catalyst activation vessel has the negative effect of decreasing the contact surface between the liquid organo-aluminum compound and the catalyst particles, thus decreasing the efficiency of the activation step.

It would be largely desirable to overcome the drawbacks generally associated with the feed of a Ziegler-Natta catalyst powder to a polymerization reactor, with the aim to avoid that gaseous components used in the storing of the catalyst powder can enter the activation vessel with the negative effect of decreasing the efficiency of the catalyst activation step.

It is therefore an object of the present invention a process for introducing a catalyst powder based on a titanium compound supported on magnesium halide into a gas-phase olefin polymerization reactor, characterized in that it comprises:
(a) storing the catalyst powder under an atmosphere of a liquid alkane having a number of carbon atoms from 3 to 12;
(b) withdrawing from step (a) a measured amount of said catalyst powder by means of a rotary valve;
(c) transferring said metered amount of catalyst powder to a catalyst activation section by a continuous pick-up flow of a liquid $C_3$-$C_{12}$ alkane;
(d) contacting the catalyst powder with a liquid phase comprising an organo-aluminum compound and optionally an external donor compound;
(e) introducing the activated catalyst powder in one or more gas-phase olefin polymerization reactors, where a gaseous mixture comprising at least one alpha-olefin is subjected to polymerization.

The process of the present invention can be successfully exploited for introducing a Ziegler-Natta catalyst powder into a gas-phase polymerization reactor. Preferably, the Ziegler-Natta solid component comprises a titanium tetrachloride compound supported on a magnesium chloride.

According to the invention, Ziegler-Natta catalyst powder is introduced inside a catalyst storage vessel, successively the tank is filled with an aliphatic hydrocarbon (alkane) having a number of carbon atoms ranging from 3 to 12. Said aliphatic hydrocarbon in the storing vessel of step a) is kept at pressures and temperatures such to maintain it in a liquid state.

The suitable amount of the liquid alkane in step a) is such that it penetrates into the pores of the catalyst particles and also completely fills the interstitial volume existing between the particles. Generally, the amount of liquid $C_3$-$C_{12}$ alkane in step a) is such that the ratio between said catalyst powder and said liquid alkane ranges from 50 to 1000 grams of catalyst for each liter of liquid alkane. Preferably, the above defined ratio ranges from 100 to 500 grams of catalyst for each liter of said liquid alkane.

In step b) of the process of the invention a rotary valve is used in order to meter a desired amount of catalyst powder and thus to transfer in the unity of time said amount of catalyst to the downstream equipment. The rotary valve is placed below the catalyst storage tank of step a) to receive directly the powder delivered by the latter and operates a periodic metering of a volume of catalyst powder. The two recesses present inside the rotor of the rotary valve are capable of communicating sequentially with the bottom part of the catalyst tank and with the inlet of the transfer line of step c) of present invention.

A rotary valve having the specific design described in the Applicant's International Application PCT/EP2008/056339 is may be employed to perform step b). Said rotary valve comprises a double sequence of sealing rings capable of keeping high value of pressure, as required by the catalyst feeding operation, inside the two recesses of the rotary valve. A flushing inert compound is continuously fed into the internal conduits of the rotor of the valve, and picks up the catalyst powder eventually passing through the sealing rings of the valve. The flushing compound enriched of the picked-up catalyst powder is then removed outside the rotary valve, and is successively conveyed to a powder collection tank.

The metered amount of catalyst powder coming from the rotary valve is continuously transferred (step c) to a catalyst activation section by a continuous pick-up flow of a liquid hydrocarbon, which is preferably the same liquid $C_3$-$C_{12}$ alkane used in step a) of catalyst storage. Preferably, the liquid alkane used in step a) and c) of the invention is selected from propane, n-butane, isobutane, n-pentane, isopentane, hexane.

According to a preferred embodiment, the liquid hydrocarbon used in step a) and c) of the invention is liquid propane, which is maintained in the catalyst storage vessel at a temperature ranging from 10° C. to 30° C. and a pressure ranging from 25 to 35 bar. Preferably the catalyst particles in step a) are stored under an atmosphere of liquid propane at a temperature from 15° C. to 25° C. and a pressure from 27 to 33 bar.

According to a preferred embodiment of the invention, one or more alpha-olefins are subjected to polymerization in a gas-phase polymerization reactor, which also comprises the presence of gaseous propane, as an inert polymerization component. In this particular case, the feed of liquid alkane, such as propane, to step a) of the invention comes directly from the monomer recovery section of the polymerization reactor. In fact, the monomer recovery section of a polymerization plant operates the separation of the inert polymerization components (such as propane) from the unreacted monomers, in such a way to obtain the inert components in a liquid state: as a consequence, liquid propane coming from the monomer recovery section may be directly fed to the catalyst storage of step a), at the above indicated ranges of pressure and temperature.

The catalyst activation step d) may be performed in a single activation vessel or in a sequence of two catalyst activation vessels, where the catalyst powder is contacted with a liquid phase comprising an organo-aluminum compound, as the cocatalyst, and optionally an external donor compound, at a temperature ranging from −20° C. to 60° C., preferably from 20° C. to 50° C.

The total residence time in the catalyst activation vessels may range from 10 to 180 minutes, preferably from 30 to 90 minutes. Preferred organo-Al compounds are Aluminum-alkyl compounds. These alkyl-Al compound are preferably chosen among trialkyl aluminum compounds, such as for example triethylaluminum, triisobutylaluminum, tri-n-butylaluminum, tri-n-hexylaluminum, tri-n-octylaluminum. It is also possible to use alkylaluminum halides, alkylaluminum hydrides or alkylaluminum sesquichlorides, such as $AlEt_2Cl$ and $Al_2Et_3Cl_3$, optionally in mixture with said trialkyl aluminum compounds.

If the successive gas-phase polymerization is targeted to obtain an isotactic propylene (co)polymer, it is advisable to use, besides the electron-donor present in the solid catalytic component, an external electron-donor (ED) added to the aluminium alkyl co-catalyst in the catalyst activation step d). These external electron donors can be selected among alcohols, glycols, esters, ketones, amines, amides, nitriles, alkoxysilanes and ethers.

The above activated catalyst particles show, in addition to a high polymerization activity, also good morphological properties that make them particularly suitable for the use in the gas-phase polymerization process of the invention.

Optionally, the activated catalyst particles may be subjected to a prepolymerization treatment by contacting the activated catalyst with little amounts of an alpha-olefin. The prepolymerization treatment is generally carried out in a liquid medium in whatever type of reactor. Therefore, continuous stirred tank reactors (CSTR) as well as loop reactors can be used for contacting the olefin monomers with the polymerization catalyst system. However, the prepolymerization is preferably carried out in a slurry loop reactor.

The average residence time of the prepolymerization is the ratio between the volume of the prepolymerization reactor and the volumetric rate of the polymeric slurry discharged from said reactor. This parameter generally ranges from 20 to 150 minutes, preferably from 30 to 80 minutes. The operating temperature generally ranges from 10 to 40° C. and a preferred range is comprised between 20 and 30° C. The polymerization degree generally ranges from 50 to 400 g of prepolymer per gram of solid catalyst component, preferably from 100 to 300 g of prepolymer per gram of solid catalyst component.

The prepolymerized catalyst system is discharged from the prepolymerization reactor and is continuously fed to the polymerization step e) of the present invention.

The present invention will be, thereafter, described in more details with reference to the enclosed drawing, which is illustrative and non-limitative of the scope of the invention.

FIG. 1 shows a preferred embodiment of the process of the invention, according to which liquid propane is used to perform steps a) and c) of the invention.

A Ziegler-Natta catalyst powder is stored under an atmosphere of liquid propane, successively activated in an activation vessel and then introduced into a gas-phase polymerization reactor. The solid catalyst component comprises a titanium tetrachloride compound supported on a magnesium chloride. The catalyst particles are introduced via line 51 as a solid powder into the catalyst storage tank 50. Liquid propane coming from the monomer recovery section (not shown in FIG. 1) of the polymerization plant is fed via line 52 to the storage tank 50.

According to the embodiment shown in FIG. 1 the amount of liquid propane is such to fill completely the storage tank 50, so that liquid propane penetrates into the pores of the catalyst particles and also completely fills the interstitial volume existing between the catalyst particles.

A rotary valve 53 is placed below the catalyst tank 50 to receive directly the catalyst powder delivered from the bottom of the tank 50. The rotary valve 53 operates a periodic delivery of a metered volume of catalyst powder to the transfer line 54.

The transfer line 54 connects the rotary valve 53 with a line 55 for feeding the catalyst powder to a catalyst activation vessel 56. The flow rate of liquid propane flowing through line 55 is adjusted by the control valve 57: accordingly, the metered catalyst powder coming from rotary valve 53 is continuously conveyed to the activation vessel 56 by said flow of liquid propane.

An organo-aluminum compound, preferably tri-ethyl-aluminum, as the catalyst activator is fed via line 60 to the activation vessel 56. Optionally, an electron donor compound may be fed to the activation vessel 56 via line 61. Once activated, the catalyst particles are hence withdrawn from the vessel 56 and fed via line 62 to a fluidized bed reactor 63.

In the exemplary embodiment of FIG. 1 the fluidized bed reactor 63 is provided with a special loop R for the continuous recirculation of the solid particles inside the reactor: this type of reactor is described in detail in the Applicant's International Application WO2007/071527.

The fluidized bed reactor 63 comprises a fluidized bed 64 of polymer, a fluidization grid 65 and a velocity reduction zone 66. The velocity reduction zone 66 is generally of increased diameter compared to the diameter of the fluidized bed portion of the reactor. The polymer bed is kept in a fluidization state by an upwardly flow of gas fed through the fluidization grid 65 placed at the bottom portion of the reactor.

The operative pressure in the fluidized bed reactor 63 is maintained at conventional values generally comprised between 10 and 30 bar, the temperature being comprised between 50 and 130° C.

The gas leaving the top of the velocity reduction zone 66 may comprise, besides the unreacted monomers, also inert condensable gases, such as alkanes, as well as inert non-condensable gases, such as nitrogen. The finest polymer particles entrained by the gas are removed in the gas/solid separator 67. Make-up monomers, molecular weight regulators, and optional inert gases are fed into the gas recycle line via line M placed upstream the compressor 68.

The recycle gas mixture is compressed by compressor 68, and cooled by the heat exchanger 69. Passing through the heat exchanger 69, the gaseous stream is cooled in order to dissipate the reaction heat and then transferred via line 70 to the bottom of the fluidized bed reactor, below the gas distribution grid 75.

The fluidized bed reactor 63 is provided with a continuous pneumatic recycle of polymer by means of a circulation loop, indicated with reference R, connecting the fluidization grid 65 to a region above the polymer bed 64.

The upper end of a vertical pipe 71 is connected to the fluidization grid 65, while its lower end is connected to the recirculation loop R. The distribution grid 65 has preferably a conical shape in such a way that its downward inclination towards the vertical pipe 71 fosters the entry of the polymer powder into the pipe 71 due to gravity. The inlet of pipe 71 is preferably located in a central position with respect to the fluidization grid 65, as shown in FIG. 1.

A control valve 72 is installed in proximity of the vertical pipe 71 for adjusting the flow rate of polymer discharged from the reactor 63 into the discharge conduit 73. Segmental ball valves or eccentric rotary type valves can be used as the control valve 72. The discharge of polymer is carried out in continuous and the opening of said control valve 72 is adjusted so as to keep constant the level of solid inside the fluidized bed reactor 63. The polymer particles not discharged through the discharge conduit 73 are continuously recycled to the upper region of the reactor running through the circulation loop R.

A "thrust gas" is generally fed via line 74 at the inlet of the circulation loop R, said thrust gas being the gaseous carrier entraining the solid particles along the circulation loop R. The control valve 75 adjusts the flow rate of "thrust gas" entering the circulation loop R. Said thrust gas can advantageously be taken from the gas recycle line of the reactor at a point downstream the compressor 68, or alternatively, downstream the heat exchanger 69. The α-olefins which can be polymerized have formula $CH_2=CHR$, where R is hydrogen or a hydrocarbon radical having 1-12 carbon atoms. Examples of polyolefins that can be obtained are:

high-density polyethylene (HDPE) having a relative density higher than 0.940, including ethylene homopolymers and ethylene copolymers with α-olefins having 3 to 12 carbon atoms;

linear polyethylene of low density (LLDPE) having a relative density lower than 0.940 and very low density and ultra low density polyethylene (VLDPEs and ULDPEs having relative densities lower than 0.920 down to 0.880) consisting of ethylene copolymers with one or more α-olefins having 3 to 12 carbon atoms;

elastomeric terpolymers of ethylene and propylene with minor proportions of diene or elastomeric copolymers of ethylene and propylene with a content of units derived from ethylene of between about 30 and 70% by weight;

isotactic polypropylene and crystalline copolymers of propylene and ethylene and/or other α-olefins having a content of units derived from propylene of more than 85% by weight;

isotactic copolymers of propylene and α-olefins, such as 1-butene, with an α-olefin content of up to 30% by weight;

impact-resistant propylene polymers obtained by sequential polymerisation of propylene and mixtures of propylene with ethylene containing up to 30% by weight of ethylene;

atactic polypropylene and amorphous copolymers of propylene and ethylene and/or other α-olefins containing more than 70% by weight of units derived from propylene;

As above explained, the process of the present invention can be successfully exploited for introducing a Ziegler-Natta catalyst powder into a gas-phase polymerization reactor.

A Ziegler-Natta catalyst system comprises the catalysts obtained by the reaction of a transition metal compound of groups 4 to 10 of the Periodic Table of Elements (new notation) with an organometallic compound of group 1, 2, or 13 of the Periodic Table of element.

In particular, the transition metal compound can be selected among compounds of Ti, V, Zr, Cr, and Hf. Preferred compounds are those of formula $Ti(OR)_nX_{y-n}$ in which n is comprised between 0 and y; y is the valence of titanium; X is halogen and R is a hydrocarbon group having 1-10 carbon atoms or a COR group. Among them, particularly preferred are titanium compounds having at least one Ti-halogen bond such as titanium tetrahalides or halogenalcoholates. Preferred specific titanium compounds are $TiCl_3$, $TiCl_4$, $Ti(OBu)_4$, $Ti(OBu)Cl_3$, $Ti(OBu)_2Cl_2$, $Ti(OBu)_3Cl$.

Preferred organometallic compounds are the organo-Al compounds and in particular Al-alkyl compounds. The alkyl-Al compound is preferably chosen among the trialkyl aluminum compounds such as for example triethylaluminum, triisobutylaluminum, tri-n-butylaluminum, tri-n-hexylaluminum, tri-n-octylaluminum. It is also possible to use alkylaluminum halides, alkylaluminum hydrides or alkylaluminum sesquichlorides such as $AlEt_2Cl$ and $Al_2Et_3Cl_3$ optionally in mixture with said trialkyl aluminum compounds.

Particularly suitable high yield ZN catalysts are those wherein the titanium compound is supported on magnesium halide which is preferably $MgCl_2$.

If a stereospecific polymerization of propylene or higher alpha-olefins is aimed, internal electron donor compounds (ID) can be added in the catalyst preparation: such compounds are generally selected from esters, ethers, amines, and ketones. In particular, the use of compounds belonging to 1,3-diethers, phthalates, benzoates and succinates is preferred.

Further improvements can be obtained by using, in addition to the electron-donor present in the solid component, an external electron-donor (ED) added to the aluminium alkyl co-catalyst component or to the polymerization reactor. These external electron donors can be selected among esters, ketones, amines, amides, nitriles, alkoxysilanes and ethers. The electron donor compounds (ED) can be used alone or in mixture with each other. Preferably the ED compound is selected among aliphatic ethers, esters and alkoxysilanes. Preferred ethers are the $C_2$-$C_{20}$ aliphatic ethers and in particular the cyclic ethers preferably having 3-5 carbon atoms, such as tetrahydrofurane (THF), dioxane.

Preferred esters are the alkyl esters of $C_1$-$C_{20}$ aliphatic carboxylic acids and in particular $C_1$-$C_8$ alkyl esters of aliphatic mono carboxylic acids such as ethylacetate, methyl formiate, ethylformiate, methylacetate, propylacetate, i-propylacetate, n-butylacetate, i-butylacetate.

The preferred alkoxysilanes are of formula $R_a^1R_b^2Si(OR^3)_c$, where a and b are integer from 0 to 2, c is an integer from 1 to 3 and the sum (a+b+c) is 4; $R^1$, $R^2$, and $R^3$, are alkyl, cycloalkyl or aryl radicals with 1-18 carbon atoms. Particularly preferred are the silicon compounds in which a is 1, b is 1, c is 2, at least one of $R^1$ and $R^2$ is selected from branched alkyl, cycloalkyl or aryl groups with 3-10 carbon atoms and $R^3$ is a $C_1$-$C_{10}$ alkyl group, in particular methyl. Examples of such preferred silicon compounds are methylcyclohexyldimethoxysilane, diphenyldimethoxysilane, methyl-t-butyldimethoxysilane, dicyclopentyldimethoxysilane. Moreover, are also preferred the silicon compounds in which a is 0, c is 3, $R^2$ is a branched alkyl or cycloalkyl group and $R^3$ is methyl. Examples of such preferred silicon compounds are cyclohexyltrimethoxysilane, t-butyltrimethoxysilane and thexyltrimethoxysilane.

The following examples will further illustrate the present invention without limiting its scope.

EXAMPLES

Characterization

The properties stated were determined according to the following methods:
Melt index E (MIE): ASTM-D 1238, condition 190/2.16
Melt index P (MIP): ASTM-D 1238, condition 190/5
Density: ASTM-D 792.

Example 1

The preparation of a linear low density polyethylene (LLDPE) using 1-butene as the comonomer is carried out in a fluidized bed reactor.

A Ziegler-Natta catalyst is used as the polymerization catalyst, comprising a titanium tetrachloride compound supported on a magnesium chloride, and prepared with the procedure described in WO 04/106388, Example 1, according to which ethylacetate is used as an internal donor compound.

The metering and feeding of the above catalyst powder is carried out by means of the embodiment shown in FIG. 1.

The catalyst polymer particles and liquid propane are fed to the storage tank 50 via lines 51 and 52 respectively. The amount of liquid propane is such to fill completely the storage tank 50, so that liquid propane penetrates into the pores of the catalyst particles and also completely fills the interstitial volume existing between the catalyst particles. Inside the storage tank 50 the catalyst is kept under an atmosphere of liquid propane at a temperature of 5° C. and a pressure of 27 bar.

The ratio between the catalyst powder and liquid propane in the hopper 50 is of 250 grams of catalyst for each liter of propane.

The rotary valve 53 receives the catalyst powder from the bottom of the tank 50 and operates a periodic delivery of a metered volume of catalyst powder to the line 55. The rotary valve 53 has a rotation speed of 180° C. every 22 seconds.

20 g/h of catalyst powder are delivered from the rotary valve 53 to the line 55, wherein a pick-up flow of liquid propane in an amount of 1.5 Kg/h continuously conveys the catalyst powder coming from the rotary valve to the catalyst activation vessel 56.

A mixture of triisobutylaluminum (TIBAL) and diethyl aluminum chloride (DEAC) in a weight ratio of 7:1 is used as the catalyst activator: said mixture is fed via line 60 to the activation vessel 56. Moreover, tetrahydrofuran as an external donor is fed to the activation vessel 56 via line 61. The above catalyst components are pre-contacted in propane at a temperature of 50° C. for 60 minutes.

After leaving the activation vessel 56, the activated catalyst powder is introduced into the fluidized bed reactor 63 for the copolymerization of ethylene with 1-butene in the presence of propane as a polymerization diluent. Hydrogen is used as the molecular weight regulator.

The ethylene/1-butene polymerization is carried out at a temperature of 80° C. and a pressure of 2.5 MPa. The composition of the gaseous reaction mixture is: 30% mol of ethylene, 16% mol of 1-butene, 7.5% mol of hydrogen and 46.5% mol of propane.

The obtained LLDPE copolymer shows a density of 0.918 g/cm$^3$, a melt index MIE of 1.0 g/10 min.

Example 2

Preparation of the Solid Catalyst Component

A magnesium chloride and alcohol adduct containing about 3 mols of alcohol was prepared following the method described in example 2 of U.S. Pat. No. 4,399,054, but working at 2000 RPM instead of 10000 RPM. The adduct were subject to a thermal treatment, under nitrogen stream, over a temperature range of 50-150° C. until a weight content of 25% of alcohol was reached.

Into a 500 mL four-necked round flask, purged with nitrogen, 250 mL of TiCl$_4$ were introduced at 0° C. Then, at the same temperature, 17.5 g of a spherical MgCl$_2$/EtOH adduct containing 25% wt of ethanol and prepared as described above were added under stirring. The temperature was raised to 130° C. in 1 h and maintained for 60 min. Then, the stirring was discontinued, the solid product was allowed to settle and the supernatant liquid was siphoned off.

The solid was washed six times with anhydrous hexane (5×100 mL) at 60° C. and once at 25° C. Finally, the solid was dried under vacuum and analyzed (Ti=4.9% wt; Mg=19.4% wt).

A solid so obtained was injected into an autoclave and kept at 30° C. stirring in anhydrous hexane (the concentration of the solid was 40 g/L) under nitrogen atmosphere. The suspension was treated with an amount of a 10% wt solution of tri-ethyl-aluminium (TEA) in hexane to achieve a ratio TEA/solid=0.5 wt/wt. An amount of propylene equal to the initial quantity of the solid was then slowly fed with a rate suitable to keep the temperature constant at 30° C. After 30 minutes the polymerization was stopped.

—Catalyst Feed—

The obtained solid catalyst component is fed to the storage tank 50 via line 51, while the storage tank is simultaneously fed with liquid propane via line 52.

Inside the storage tank 50 the catalyst is kept under an atmosphere of liquid propane at a temperature of 30° C. and a pressure of 30 bar. The ratio between the catalyst powder and liquid propane in the hopper storage tank is of 170 grams of catalyst for each liter of propane.

The rotary valve 53 receives the catalyst powder from the bottom of the tank 50 and operates a periodic delivery of a metered volume of catalyst powder to the line 55. The rotary valve 53 has a rotation speed of 180° C. every 45 seconds.

10 g/h of catalyst powder are delivered from the rotary valve 53 to the line 55, wherein a pick-up flow of liquid propane in an amount of 1.5 Kg/h continuously conveys the catalyst powder coming from the rotary valve to the catalyst activation vessel 56.

Triisobutylaluminum (TIBAL) is used as the catalyst activator, which is fed via line 60 to the activation vessel 56. No external donor is used in this example. The above catalyst components are pre-contacted in liquid propane at a temperature of 20° C. for 60 minutes.

—Polymerization—

After leaving the activation vessel, the activated catalyst powder is introduced into a sequence of two serially connected fluidized bed reactors (not shown in FIG. 1), wherein a high density polyethylene (HDPE) suitable for the pipes preparation is produced.

Ethylene is copolymerized with 1-hexene in the presence of propane as a polymerization diluent: the molar concentrations of hydrogen (molecular weight regulator) are differentiated inside the two reactors. The polymerization conditions and monomer compositions in the 1$^{st}$ and in the 2$^{nd}$ fluidized bed reactors are indicated in the below TABLE 1.

The obtained HDPE shows a density of 0.948 g/cm$^3$, a melt index MIP of 0.3 g/10 min.

TABLE 1

|  | 1$^{st}$ fluidized bed reactor | 2$^{nd}$ fluidized bed reactor |
|---|---|---|
| Temperature (° C.) | 80 | 75 |
| Pressure (bar) | 25 | 25 |
| C$_2$H$_4$ (% mol) | 30 | 8 |
| H$_2$/C$_2$H$_4$ (molar ratio) | 0.25 | 3.8 |
| C$_6$H$_{12}$ (% mol) | — | 0.75 |

The invention claimed is:

1. A process for introducing a catalyst powder based on a titanium compound supported on magnesium halide into a gas-phase olefin polymerization reactor, the process comprising:
   (a) storing the catalyst powder under an atmosphere of a liquid alkane having 3 to 12 carbon atoms;
   (b) withdrawing from step (a) a measured amount of said catalyst powder by means of a rotary valve;
   (c) transferring said metered amount of catalyst powder to a catalyst activation section by a continuous pick-up flow of a liquid C$_3$-C$_{12}$ alkane;
   (d) contacting in a sequence of two catalyst activation vessels, the catalyst powder with a liquid phase comprising an organo-aluminum compound and optionally an external donor compound; and
   (e) introducing the activated catalyst powder in at least one gas-phase olefin polymerization reactor, where a gaseous mixture comprising at least one alpha-olefin is subjected to polymerization.

2. The process according to claim 1, wherein the organo-aluminum compound of step (d) is selected from triethylaluminum, triisobutylaluminum, tri-n-butylaluminum, tri-n-hexylaluminum or tri-n-octylaluminum.

3. The process according to claim 1, wherein the external electron donor of step (d) is selected from alcohols, glycols, esters, ketones, amines, amides, nitriles, alkoxysilanes or ethers.

4. The process according to claim 1, wherein the ratio between said catalyst powder and said liquid alkane in step a) ranges from 50 to 1000 grams of catalyst for each liter of liquid alkane.

5. The process according to claim 4, wherein said ratio ranges from 100 to 500 grams of catalyst for each liter of said liquid alkane.

6. The process according to claim 1, wherein said liquid $C_3$-$C_{12}$ alkane of step c) is the same $C_3$-$C_{12}$ alkane used in catalyst storage step a).

7. The process according to claim 1, wherein said liquid $C_3$-$C_{12}$ alkane of steps a) and c) is selected from propane, n-butane, isobutane, n-pentane, isopentane, or hexane.

8. A process for introducing a catalyst powder based on a titanium compound supported on magnesium halide into a gas-phase olefin polymerization reactor, the process comprising:

(a) storing the catalyst powder under an atmosphere of liquid propane;

(b) withdrawing from step (a) a measured amount of said catalyst powder by means of a rotary valve;

(c) transferring said metered amount of catalyst powder to a catalyst activation section by a continuous pick-up flow of liquid propane;

(d) contacting the catalyst powder with a liquid phase comprising an organo-aluminum compound and optionally an external donor compound; and (e) introducing the activated catalyst powder in at least one gas-phase olefin polymerization reactor, where a gaseous mixture comprising at least one alpha-olefin is subjected to polymerization.

9. The process according to claim 8, wherein said liquid propane in step (a) is maintained at a temperature ranging from 10° C. to 30° C. and a pressure ranging from 25 to 35 bar.

10. The process according to claim 1, wherein the feed of said liquid alkane to step a) comes directly from the monomer recovery section of said at least one gas-phase polymerization reactor.

\* \* \* \* \*